Dec. 6, 1949
H. J. LEMMENS
2,490,528
METHOD OF MAKING GLASS BODIES COMPRISING
A TUBULAR GLASS MEMBER
Filed April 22, 1946
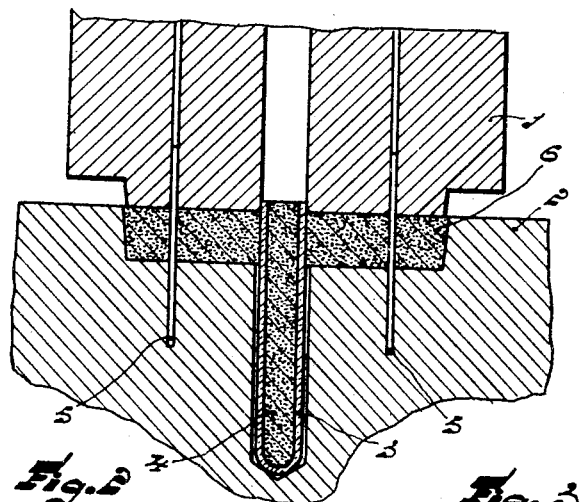
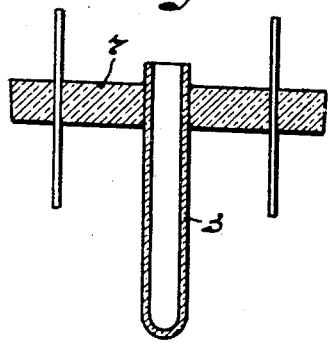 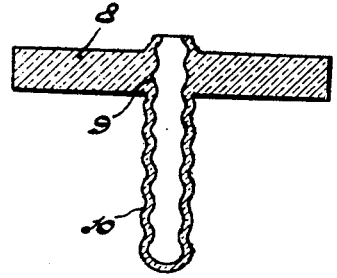
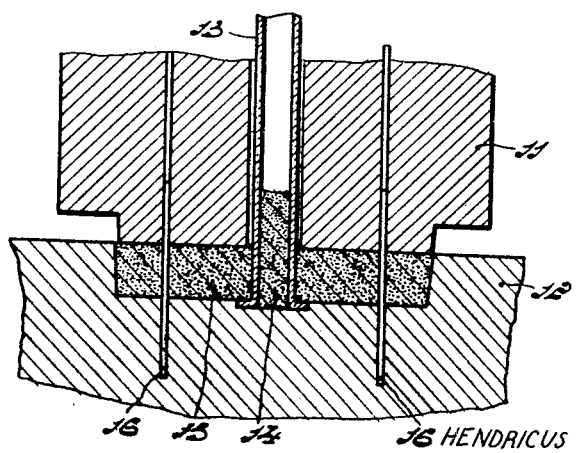
INVENTOR.
HENDRICUS JOHANNES LEMMENS
BY
ATTORNEY Patented Dec. 6, 1949

2,490,528

UNITED STATES PATENT OFFICE 2,490,528

METHOD OF MAKING GLASS BODIES COMPRISING A TUBULAR GLASS MEMBER

Hendricus Johannes Lemmens, Eindhoven, Netherlands, assignor, by mesne assignments, to Hartford National Bank and Trust Company, Hartford, Conn., as trustee Application April 22, 1946, Serial No. 663,828
In the Netherlands April 25, 1942

Section 1, Public Law 690, August 8, 1946
Patent expires April 25, 1962

9 Claims. (Cl. 49—78)

The present invention relates to a method of making glass bodies comprising a tubular glass member, more particularly bottom discs for electric discharge tubes or incandescent lamps comprising an exhaustion tube, in which method the mass of glass to be formed into the glass body is melted, if required under pressure.

In making glass bodies, for which glass is used which is rendered thinly liquid by strong heating and is given the desired shape in a mould under pressure, the drawback is experienced that the provision of a tubular member, for instance an exhaustion tube, is not simple. In fact, direct provision of an exhaustion tube in the mould is not possible, since it also becomes liquid at the seal and is then closed. This difficulty might be avoided by providing a metal tube in the mould or by moulding a nozzle to the glass body, to which the exhaustion tube may be sealed afterwards. Although such a method might yield good results it has the drawback that the provision of the exhaustion tube must always take place by means of an additional operation and that this additional seal is not contributive to the mechanical strength of the object.

In forming a pinch with an exhausting tube it was already known to fill this tube with graphite or asbestos fibres which materials were baked together to form a rod by means of a binder. After forming the pinch the binder was decomposed by further heating of the pinch. However, such a method is not practicable when the glass, in forming the glass body, is melted at such a high temperature as to cause premature decomposition of the binder by means of which the rod has been formed. In fact, the formation of pinches or the like takes place at a temperature at which the glass just begins to become ductile or soft. Furthermore it was known to melt a rod-shaped member into a pinch, the coefficient of expansion of this member being higher than that of the glass. After cooling this member is released so that it can be removed. The channel thus produced emptied in the exhaustion tube. Again it has been suggested in forming the pinch to move a rod-shaped core through the exhaustion tube, as a result of which the exhaustion tube cannot be closed at the pinch. However, all these methods are only possible if the glass is treated at a temperature at which the viscosity is fairly considerable. The latter is not the case, however, when it is desired to make a glass body by making use of a mass of glass consisting, for instance, of glass powder and consequently having to be melted completely in giving it the correct shape. In this case, consequently, one would have to use the first-mentioned method which requires an additional treatment for sealing the exhaustion tube.

By means of a method according to the invention it is possible, however, to execute in one operation the formation of the glass body and the sealing of the tubular member into this body, while the other difficulties inherent to the known methods are obviated. According to the invention a glass body, which is furnished with a tubular glass member such as an exhaustion tube, is made by at least partly filling this previously formed tubular member with a powdery material and introducing the tubular member into a mould, together with other bodies to be sealed into the finished glass body. Then the mould is filled with a glass mass which is caused to melt by heating, if required under pressure, so that this mass melts together with a part of the tubular member to form a glass body. The powder material is then removed from the tubular member. Thus it is achieved in an efficient manner that the glass mass can be completely melted without the tubular member being closed. In this way the glass mass is completely melted together with the tube and it is not necessary to separately seal a tube to the glass body. Of course, the powdery material must be so chosen that it is not liable to such deformations at the temperatures occurring during the operations as to be incapable of performing any longer its function of keeping the tubular member open or of being removed from this member. Thus, for instance, the powder must have such a composition and purity as to avoid baking together or sintering, since in this case removal of this material from the tubular glass member is very difficult. Furthermore, when making use of a material melting at a certain temperature this melting point should materially exceed that of the most commonly used kinds of glass and consequently exceed 1000° C. to 1200° C. The materials used may be, for instance, finely powdered quartz, sand, powder of refractory metals such as tungsten or molybdenum, graphite powder or the like.

A very suitable effect is obtained when excessive pressure is avoided in forming the glass body and, the invention may be used with much advantage in forming bodies from glass powder melted under a very low pressure for then a glass body is obtained which consists of at least 5% of finely distributed cavities.

A glass body produced by means of the method of the invention is particularly suitable for use as a bottom plate or a bottom disc for electric discharge tubes or incandescent lamps. Now it is possible to manufacture in one operation the whole of the bottom plate with the exhaustion tube and metal parts such as supply wires incorporated therein, the metal parts preferably acting as contact pins at the same time.

The method according to the present invention will be more fully explained by reference to the accompanying drawing, in which Fig. 1 shows a vertical, sectional view of a mould for forming a glass body according to the invention, and Figs. 2 and 3 show forms of construction of such glass bodies in vertical section.

Figure 4 shows in vertical section a modified form of construction of mould and glass body which is particularly suitable for the provision of tubular bodies having a considerable length.

In Figure 1 the reference number 1 designates the upper die, 2 being the bottom die of a mould. The bottom die is provided with a bore accommodating a tubular body 3, in the case under view an exhaustion tube, which is filled with a powdery material 4. Furthermore the bottom die exhibits bores in which may be provided metal rods 5 which may be formed as supply conductors and as contact pins at the same time and which are to be sealed into the glass body to be formed.

After the exhaustion tube 3, which may be filled with sand, and the conductors 5 have been introduced into the mould the space between the dies is filled, for instance, with glass powder 6. Upon heating, during which operation the glass powder melts, the mould is closed and the glass body is moulded into the correct form under a slight pressure due for example to the weight of the upper part of the mould. The upper die is provided with corresponding apertures for the upper ends of the exhaustion tube and the conductors. After moulding, a body 7 (Fig. 2) is obtained which consists of glass having such a structure that it consists for at least 5% of finely distributed cavities, the body 7 being in the present case a bottom part for discharge tubes or incandescent lamps. The sand may be removed from the exhaustion tube in a simple manner, for instance by tapping, whereupon the exhaustion tube can be opened by cutting the closed end.

The use of a powder material, for instance, sand, has the advantage that one is not bound to a definite shape of the exhaustion tube. Thus, it is also possible to make use of an exhaustion tube or other tubular member whose inner space has any desired form. Figure 3, for instance, represents a tubular member, which may be resilient and used, for instance, for connecting a rubber tube; after forming the glass body 8 the sand may be directly removed from the space of the undulatory tube 10. If desired, the seal 9 may also be undulatory. By cutting the end from the tube 10 an open tube is obtained. However, this end may also be open beforehand in which case a mould as shown in Figure 4 is preferably used.

When a long tubular member is to be sealed in, use may be made of the mould shown in Figure 4, in which the reference numbers 11 and 12 designate the upper and bottom die respectively, the long tube 13 extending upwards and bearing with one end, which may preferably be furnished with a flange, on the bottom mold 12. It will be obvious that the filling of the powdery material needs to extend only to such extent as is necessary for avoiding the risk of the tube 13, becoming sealed and closed. Consequently the sand filling 14 need not fill the whole tube 13. After affixing the tube 13 and the conductors 16, the mould is filled with glass powder 15 and heated, thus forming the glass body under a slight pressure.

When it is desired to make a body consisting of clear glass without finely distributed cavities the pressure has to be raised, as a result of which the glass powder melts to form a gas-free mass of glass.

The glass body produced by means of the method according to the invention may be used for all possible purposes. Although herein before only the use as a tube or lamp bottom has been referred to, such a body may be used for various purposes, for instance as a cover for a vacuum exsiccator and other spaces where gases or liquids must be supplied and carried off. As an alternative an optional number of tubular members may be provided in the glass body. Of course, the glass body itself need not always be shaped as a plate, but may have any desired shape, which may be obtained by means of the method set out above.

I claim:

1. In a method of making a glass body including a tubular glass member, the steps of positioning said tubular glass member in a mold adapted for receiving said member, filling at least a part of said member with a powdery material of high melting point, filling a mass of powdered glass into said mold around said member, heating said mass of powdered glass to melting temperature, applying pressure to said mass during the heating thereof, thereby causing a shaping of said glass mass into said glass body and a sealing thereof to said member, and removing said powdery material from said member.

2. In a method of making a glass body including a tubular glass member of given melting point, the steps of positioning said tubular glass member in a mold adapted for receiving said member, filling at least a part of said member with a powdery material of a higher melting point than that of the glass of said member, filling a mass of powdered glass into said mold around said member, heating said mass of powdered glass to melting temperature, applying pressure to said mass during the heating thereof, thereby causing a shaping of said glass mass into said glass body and a sealing thereof to said member, and removing said powdery material from said member.

3. In a method of making a glass body including a tubular glass member, the steps of positioning said tubular glass member in a mold adapted for receiving said member, filling at least a part of said member with sand, filling a mass of powdered glass into said mold around said member, heating said mass of powdered glass to melting temperature, applying pressure to said mass during the heating thereof, thereby causing a shaping of said glass mass into said glass body and a sealing thereof to said member, and removing said sand from said tubular member.

4. In a method of making a glass body including a tubular glass member, the steps of positioning said tubular glass member in a mold adapted for receiving said member, filling at least a part of said member with graphite powder, filling a mass of powdered glass into said mold around said member, heating said mass of powdered glass to melting temperature, applying pressure to said mass during the heating thereof, thereby causing a shaping of said glass mass into said glass body and a sealing thereof to said member, and removing said graphite powder from said tubular member.

5. In a method of making a glass body including a tubular glass member of given melting point, the steps of positioning said glass member in a mold adapted for receiving said member, filling at least a part of said member with a powdery material having a higher melting point than that of the glass of said member, positioning at least one other element in said mold for being sealed simultaneously with said member into said glass body to be formed, filling a mass of powdered glass into said mold around said member near an end thereof and in an arrangement to embed said other element, heating said mass to melting temperature, applying pressure to said mass during the heating thereof, thereby causing a shaping of said glass mass into said glass body and a sealing thereof to said tubular member and said other element, and removing said powdery material from said member.

6. In a method of making a glass body of the type used in electric discharge tubes and other evacuated devices including an exhaust tube, the steps of introducing a tubular glass member of given melting point adapted to form said exhaust tube into a mold having a bore for receiving said member, filling said member at least partly with a powdery material having a higher melting point than the glass of said member, positioning a plurality of wires in said mold for being sealed with said member into said glass body to be formed, filling a mass of powdered glass into said mold around said tubular member in an arrangement to embed said tubular member and said wires, heating said mass to melting temperature applying pressure to said mass during the heating thereof, thereby causing a shaping of said glass mass into said glass body and a sealing thereof to said tubular member and said wires, and removing said powdery material from said member.

7. In a method of making a glass body of the type used in electric discharge tubes and other evacuated devices including an exhaust tube, the steps of introducing a tubular glass member adapted to form said exhaust tube into a mold having a bore for receiving said member, filling said member at least partly with sand, positioning a plurality of wires in said mold for being sealed with said member into said glass body to be formed, filling a mass of powdered glass into said mold around said tubular member in an arrangement to embed said tubular member and said wires, heating said mass to melting temperature, applying pressure to said mass during the heating thereof, thereby causing a shaping of said glass mass into said glass body and a sealing thereof to said tubular member and said wires, and removing said sand from said member.

8. In a method of making a glass body of the type used in electric discharge tubes and other evacuated devices including an exhaust tube, the steps of introducing a tubular glass member adapted to form said exhaust tube into a mold having a bore for receiving said member, filling said member at least partly with graphite powder, positioning a plurality of wires in said mold for being sealed with said member into said glass body to be formed, filling a mass of powdered glass into said mold around said tubular member in an arrangement to embed said tubular member and said wires, heating said mass to melting temperature, applying pressure to said mass during the heating thereof, thereby causing a shaping of said glass mass into said glass body and a sealing thereof to said tubular member and said wires, and removing said graphite powder from said member.

9. In a method of making a glass body of the type used in electric discharge tubes and other evacuated devices including an exhaust tube, the steps of introducing a tubular glass member of given melting point adapted to form said exhaust tube into a mold having a bore for receiving said member, filling said member at least partly with a powdery material having a higher melting point than the glass of said member, positioning a plurality of wires in said mold for being sealed with said member into said glass body to be formed, filling a mass of powdered glass into said mold around said tubular member in an arrangement to embed said tubular member and said wires, heating said mass to melting temperature, applying a slight pressure to said mass during the heating thereof, thereby causing a shaping of said glass body and a sealing thereof to said tubular member and said wires, while leaving in said glass body a number of finely distributed cavities comprising about 5% of said body.

HENDRICUS JOHANNES LEMMENS.

REFERENCES CITED

The following references are of record in the file of this patent:

UNITED STATES PATENTS

| Number | Name | Date |
|---|---|---|
| 1,923,148 | Hotchner | Aug. 22, 1933 |
| 2,030,185 | Rose | Feb. 11, 1936 |
| 2,347,421 | Little | Apr. 25, 1944 |